Figure 1:
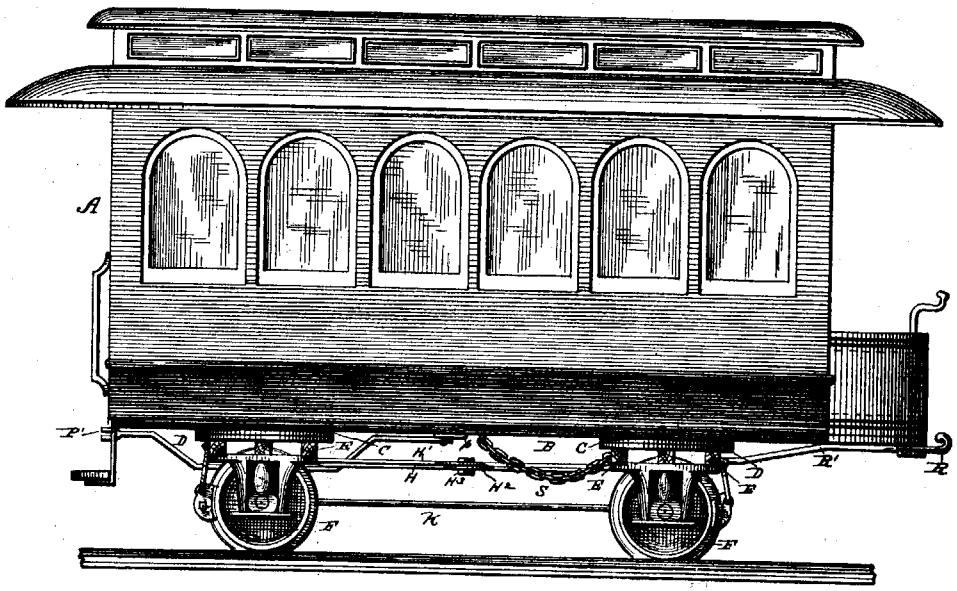

2 Sheets—Sheet 1.

F. A. GRAFF.

CAR TRUCK.

No. 10,660. Reissued Nov. 10, 1885.

WITNESSES

Chas. H. Davis

John C. Jenkins

INVENTOR

Francis A. Graff.

by C. M. Alexander his Attorney

N. PETERS. Photo-Lithographer, Washington, D. C.

2 Sheets—Sheet 2.

F. A. GRAFF.

CAR TRUCK.

No. 10,660. Reissued Nov. 10, 1885.

WITNESSES

Chas. H. Evans

John C. Jenkins

INVENTOR

F. A. Graff

By C. H. Alexander

Attorney

N. PETERS, Photo-Lithographer, Washington, D. C.

UNITED STATES PATENT OFFICE.

FRANCIS A. GRAFF, OF NEW ALBANY, INDIANA.

CAR-TRUCK.

SPECIFICATION forming part of Reissued Letters Patent No. 10,660, dated November 10, 1885.

Original No. 325,532, dated September 1, 1885. Application for reissue filed October 8, 1885. Serial No. 179,351.

*To all whom it may concern:*

Be it known that I, FRANCIS A. GRAFF, a citizen of the United States, residing at New Albany, in the county of Floyd and State of Indiana, have invented certain new and useful Improvements in Car-Trucks, of which the following is a specification, reference being had therein to the accompanying drawings.

The object of this improvement is to lighten the draft of car-trucks and other wheeled vehicles by so constructing and connecting the running-gear of the same that their front and rear axles will be simultaneously adjusted in divergent positions, and thereby cause the front and rear wheels to describe circles or curves in unison with each other. These results are attained by the mechanism illustrated in the drawings herewith filed as part hereof, in which the same letters of reference denote the same parts in the different views.

Figure 2:
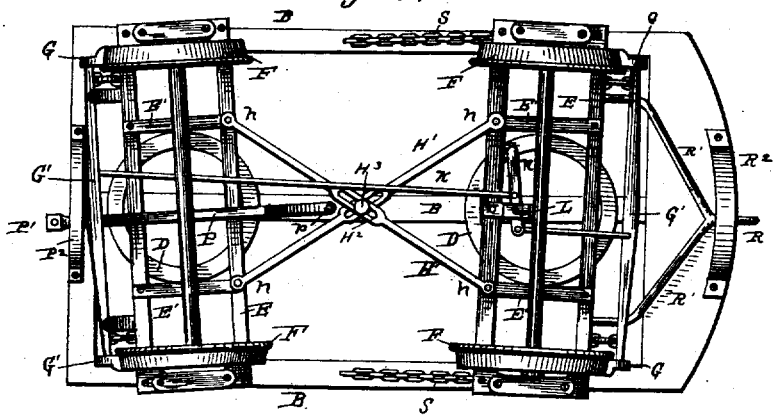
Figure 3:
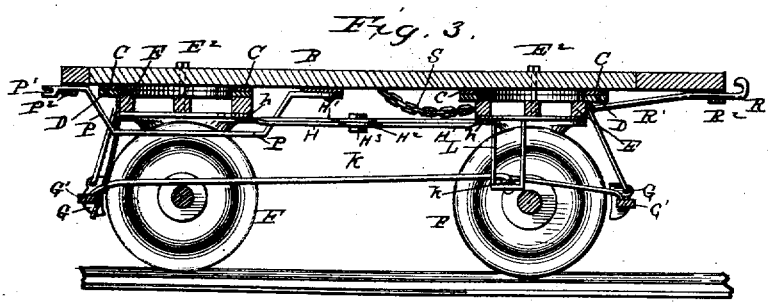
Figure 4:
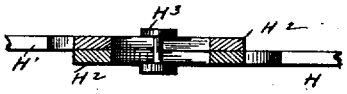

Figure 1 is a side elevation representing the application to a street-car of running-gear embodying the features of my improvement. Fig. 2 is a view of the running-gear inverted. Fig. 3 is a longitudinal vertical section of the same. Fig. 4 is a longitudinal sectional representation of details.

A is the body of the car. B is the base-frame thereof.

C C are circular bearing-plates affixed to the car frame-work B. D D are corresponding bearing-plates suitably secured to the truck-frames E E.

F F are the truck-wheels, connected to the truck-frames E E in the ordinary manner, as shown. The truck-frames are secured to the frame B by the bolts $E^2$, as fully shown in Fig. 3.

G G are ordinary brake-shoes.

H H′ represent bars having slotted enlargements $H^2$, for the reception of a double-headed bolt, $H^3$, and diagonally connected in opposite directions to the truck-frames E E, to which their ends are pivoted, as shown at *h h′*, Fig. 2.

K K′ are rods connecting the brake-shoe-supporting frames G′ G′ with a brake-lever, *k*, pivoted to a stud-frame, (shown at L,) and secured to the truck-frame by any suitable means.

R is the draft-hook, having arms R′, by means of which the hook is connected with the truck-frame E.

P is a bar pivoted at *p* to the base-frame B, and provided with suitable bends, as shown, to clear the truck mechanism, and project beyond the rear end of the car, where it is provided with a slotted eye, P′, for a purpose hereinafter set forth.

$R^2$ is a bearing-plate for the draft-hook R. $P^2$ is a bearing-plate for the bar P, which operates as a link or draw-bar for connecting other cars as occasion may require.

E′ E′ are metal plates transversely secured to the truck-frames E for the purpose of strengthening the same and additionally securing the connections of the diagonal bars H H′.

S S are chains connecting the forward truck-frame with the body of the car, for the purpose of preventing the divergent adjustment of the trucks to an extent that would strain the slotted connection of the bars H H′.

As the draft on the hook R is inclined to one side or the other, the double-headed bolt $H^3$ will slide in the slots of bars H H′, which, by reason of the sliding bolt $H^3$, will take exactly equal adjustment in opposite directions, and by holding both ends of the opposite trucks in exact relative position with each other cause the motion of the corresponding truck-wheels to be exactly the same, and thereby facilitate the movement of the car through curves in the track.

By reason of the connection of the draft-hook with the outer ends of the truck-frame, through its diverging arms R′, the adjustment of the leading truck to the direction of the track-curves can be done by less draft than with the ordinary connection, and a comparative directness of the draft to the load will also be continuously maintained, and the exertion of the draft-animals ordinarily necessary to draw cars, especially when more or less loaded, around curves will be greatly relieved. Requisite action of the brake-shoes G G is obtained by connecting the lever *k* in the usual manner to the ordinary brake mechanism.

Having explained the construction and operation of my improvement, what I claim as new, and desire to secure by Letters Patent, is—

1. Combined with car-trucks, centrally-slotted diagonal bars connecting the relatively-opposite ends of said trucks, and a bolt retaining the central portions of the bars together and traveling in said slots, substantially as and for the purpose specified.

2. A running-gear for cars, consisting of pivoted trucks, centrally-slotted diagonal bars connecting the relatively-opposite ends of said trucks, a bolt passing through said slots and traveling in them, a draw-bar with diverging ends connected to one of the trucks, and an independent pivoted draw-bar at the other end of the car, substantially as and for the purpose specified.

In testimony whereof I affix my signature in presence of two witnesses.

FRANCIS A. GRAFF.

Witnesses:
GEORGE H. DEVOL,
TOM MCCULLOCH.